(12) United States Patent
Meiyappan et al.

(10) Patent No.: US 12,425,684 B2
(45) Date of Patent: Sep. 23, 2025

(54) SYNCHRONIZING BLUETOOTH DATA CAPTURE TO DATA PLAYBACK

(71) Applicant: BOSE CORPORATION, Framingham, MA (US)

(72) Inventors: Somasundaram Meiyappan, Chennai (IN); Nathan Blagrove, Hanover, MA (US); Francois Laberge, Framingham, MA (US)

(73) Assignee: Bose Corporation, Framingham, MA (US)

(*) Notice: Subject to any disclaimer, the term of this patent is extended or adjusted under 35 U.S.C. 154(b) by 447 days.

(21) Appl. No.: 17/376,328

(22) Filed: Jul. 15, 2021

(65) Prior Publication Data

US 2022/0038769 A1 Feb. 3, 2022

(30) Foreign Application Priority Data

Jul. 28, 2020 (IN) .............................. 202041032297

(51) Int. Cl.
| | |
|---|---|
| *H04N 21/439* | (2011.01) |
| *G10L 25/06* | (2013.01) |
| *H04N 21/43* | (2011.01) |
| *H04R 3/12* | (2006.01) |
| *H04W 4/80* | (2018.01) |

(52) U.S. Cl.
CPC ......... *H04N 21/4398* (2013.01); *G10L 25/06* (2013.01); *H04N 21/4307* (2013.01); *H04R 3/12* (2013.01); *H04W 4/80* (2018.02); *H04R 2420/07* (2013.01)

(58) Field of Classification Search
None
See application file for complete search history.

(56) References Cited

U.S. PATENT DOCUMENTS

| | | | |
|---|---|---|---|
| 2013/0016820 A1* | 1/2013 | Takayama | H04B 3/23 379/406.01 |
| 2016/0014373 A1* | 1/2016 | LaFata | H04M 9/082 348/14.08 |
| 2016/0057316 A1* | 2/2016 | Godfrey | G10L 21/013 704/207 |
| 2018/0137876 A1* | 5/2018 | Sun | G10L 21/0216 |
| 2019/0335283 A1* | 10/2019 | Chaudhary | G06F 3/162 |
| 2021/0055905 A1* | 2/2021 | Moldover | H04N 21/41407 |
| 2022/0343886 A1* | 10/2022 | McCutcheon | G10K 11/17854 |

* cited by examiner

*Primary Examiner* — Walter F Briney, III
(74) *Attorney, Agent, or Firm* — Patterson + Sheridan, LLP

(57) ABSTRACT

Processes, methods, systems, and devices are disclosed for synchronizing wirelessly transmitted captured audios to audio output. In an aspect, a user device transmits an audio output associated with the audio playback to a wireless audio device. The user device receives a feedback signal corresponding to the audio output played at the wireless audio device. The user device further receives a captured audio from the wireless audio device. The user device synchronizes the captured audio with the audio output based on the feedback signal. For example, the audio output may be an instrumental soundtrack and the captured audio may be a recording of the user's singing in response to the instrumental soundtrack. In other examples, the audio output may be a soundtrack from a video playback or live streaming. The captured audio may be a commentary or a response to the video playback or the live streaming.

21 Claims, 7 Drawing Sheets

SYNCHRONIZING BLUETOOTH DATA CAPTURE TO DATA PLAYBACK

CROSS-REFERENCE TO RELATED APPLICATION

This application claims priority to and benefit of Indian Patent Application No. 202041032297, filed Jul. 28, 2020, the contents of which are herein incorporated by reference in its entirety as fully set forth below.

FIELD

Aspects of the disclosure generally relate to wireless communication, and more specifically to a Bluetooth communication between devices.

BACKGROUND

Audio recordings sent via wireless methods in response to incoming signals often experience noticeable delay. For example, karaoke captured audios using Bluetooth microphones often experience noticeable delays that lag behind a background sound track. Due to a lack of accurate modeling of delays involved in Bluetooth—the background audio (karaoke sound track) played back to the headphone and the voice captured from the Bluetooth microphone are not precisely matched.

Bluetooth is a wireless communication technology standard for exchanging data between fixed or mobile devices over short distances. In order to use the Bluetooth protocol, a device is often compatible with the subset of Bluetooth profiles (often called services) necessary to use the desired services. A Bluetooth profile is a specification regarding an aspect of Bluetooth-based wireless communication between devices. Two widely used Bluetooth profiles for communication of audio between a Bluetooth source (e.g., smartphone) and a Bluetooth accessory device (e.g., Bluetooth audio headphones) include the Hands Free Profile (HFP) and the Advanced Audio Distribution Profile (A2DP).

HFP is designed to exchange low latency and relatively lower quality, bi-directional voice audio (e.g., voice data related to phone calls) and has a latency of about 40 milliseconds (ms) but limits the sampling rate either to 8 kiloHertz (kHz) (narrowband, i.e. 4 kHz of audio bandwidth) or 16 kHz (wideband, i.e. 8 kHz of audio bandwidth). Wideband speech HFP packets are encoded using the low-complexity subband codec (mSBC), at a fixed rate of 64 kilobits per second (kbps). The bi-directional voice audio is limited to a single channel (i.e., mono) of voice data captured using one microphone according to the present HFP. HFP often limits the quality to a low 16 KHz sampled audio/voice. Because of such limits, music creation using Digital Audio Workstations (DAW) requires modeling of both the output and input latencies. The latencies are involved in playback of some audio tracks and the voice capture respectively, which cannot be totally eliminated in such wireless communications.

A2DP defines a way to send full bandwidth audio (e.g., higher quality audio such as music) in a single direction, such as from a smart phone to Bluetooth headphones. Most Bluetooth wireless audio devices choose a sampling frequency of 44.1 kHz or 48 kHz for A2DP communication. SBC is the mandatory codec used for transmitting A2DP audio and typically sends high quality audio data at around 350 kbps. Optional codecs like Advanced Audio Coding (AAC) usually send audio data at around 250 kbps. A2DP audio is sent over the Logical Link Control and Adaptation Protocol (L2CAP), which schedules packets asynchronously. As such, A2DP audio face similar delay difficulties in matching to existing playback sound track via Bluetooth communications.

Accordingly, methods for communicating high quality audio data over a Bluetooth link that enable precise and accurate matching to an existing audio source, as well as apparatuses and systems configured to implement these methods are desired.

SUMMARY

All examples and features mentioned herein can be combined in any technically possible manner.

Aspects of the present disclosure provide a method performed by a user device for synchronizing a captured audio to an audio playback. The captured audio may be wirelessly transmitted from a wireless audio device, for example by a Bluetooth connection. In aspects, the user device transmits an audio output associated with the audio playback to the wireless audio device. The user device then receives a feedback signal corresponding to the audio output played at the wireless audio device. The user device further receives a captured audio from the wireless audio device. The user device synchronizes the captured audio with the audio output using the feedback signal. For example, the audio output may be an instrumental soundtrack and the captured audio may be a recording of the user's singing in response to the instrumental soundtrack. In other examples, the audio output may be a soundtrack from a video playback or live streaming. The captured audio may be a commentary or a response to the video playback or the live streaming.

In aspects, the user device may synchronize the captured audio with the audio output by determining, based on the feedback signal, a delay, such as a transmission delay, a round-trip delay, or associated delays for the audio transmitted by the user device to be played back at the wireless audio device and the corresponding feedback signal to be returned back to the application executing in the user device. For example, the user device may perform a cross correlation between the feedback signal and the audio output. Round-trip delay calculated in the above manner is also the delay required to synchronize the captured audio, which was captured at the wireless audio device synchronously with the feedback signal at the wireless audio device, with the audio output from the user device.

In aspects, the user device may trim the captured audio to the audio output based on the identified round-trip delay. In some cases, synchronizing the captured audio with the audio output using the feedback signal includes mixing the trimmed captured audio and the audio output to output a final audio. The user device may play a video clip and extract the audio output from the video clip. The user device may further extract a visual sequence from the video clip. Then, the user device may merge the extracted visual sequence with the final audio to form a synchronized video clip.

In aspects, the feedback signal may include a component associated with the captured audio. For example, the user device may further remove the component associated with the captured audio from the feedback signal to generate an updated feedback signal. The user device may determine the delay, such as the transmission delay or the round-trip delay, based on the updated feedback signal. In some instances, determining the delay includes performing a cross correlation between the updated feedback signal and the audio output.

In aspects, the user device further performs noise reduction of the captured audio. In other aspects, the feedback signal may include a device specific value that indicates a hardware delay of the wireless audio device. The user device may loop back an advanced audio distribution profile (A2DP) stream to determine the device specific value. For example, the user device may provide a timecode to the audio output and determine a start of an audio streaming session based on the timecode attached to the captured audio by the wireless audio device. The user device may align the start of the audio streaming session with a start of the audio output to synchronize the captured audio.

In aspects, the user device sends a fixed presentation delay of the audio output of the wireless audio device via an isochronous channel. For example, the isochronous channel may be according to Bluetooth technical specification version 5.2. The fixed presentation delay of the audio output may assist in determining the transmission delay and the return delay (e.g., the round-trip delay).

In aspects, the user device provides a user interface thereon. The user device provides via the user interface a set of playback selection and synchronization options. The user device further provides a capability for the user to initiate a video playback that provides the audio output and synchronize the captured audio with the video playback.

Aspects of the present disclosure provide a method for a wireless audio device to synchronize a captured audio with a received audio output from a user device. The wireless audio device may receive, via a wireless transceiver, an audio output from a user device. The wireless audio device may then transmit, via the wireless transceiver, a feedback signal corresponding to the audio output played at the wireless audio device to the user device. The wireless audio device may record, using at least one microphone, a captured audio synchronously with the capturing or generation of the feedback signal. The wireless audio device then transmits the captured audio via the wireless transceiver. In some cases, the captured audio is synchronized with the audio output from the user device based on the feedback signal provided by the user device.

In aspects, the wireless audio device may trim the captured audio to the audio output based on an identified delay, such as a transmission delay, a return delay, or both (i.e., a round-trip delay) determined based on the feedback signal.

In aspects, the feedback signal may include a component associated with the captured audio. In aspects, the wireless audio device may remove the component associated with the captured audio from the feedback signal to generate an updated feedback signal. The wireless audio device may determine the round-trip delay based on the updated feedback signal. The round-trip delay may be determined by performing a cross correlation between the updated feedback signal and the audio output.

In aspects, the wireless audio device may perform noise reduction of the captured audio.

In aspects, the feedback signal may include a device specific value indicating hardware delay of the wireless audio device. The wireless audio device may loop back an advanced audio distribution profile (A2DP) stream to determine the device specific value. The audio output may include a timecode provided by the user device. The wireless audio device may determine a start of an A2DP session based on the timecode attached to the captured audio.

In aspects, the wireless audio device may receive a fixed presentation delay of the audio output from the user device via an isochronous channel. The fixed presentation delay of the audio output may assist in determining the transmission delay and the return delay.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
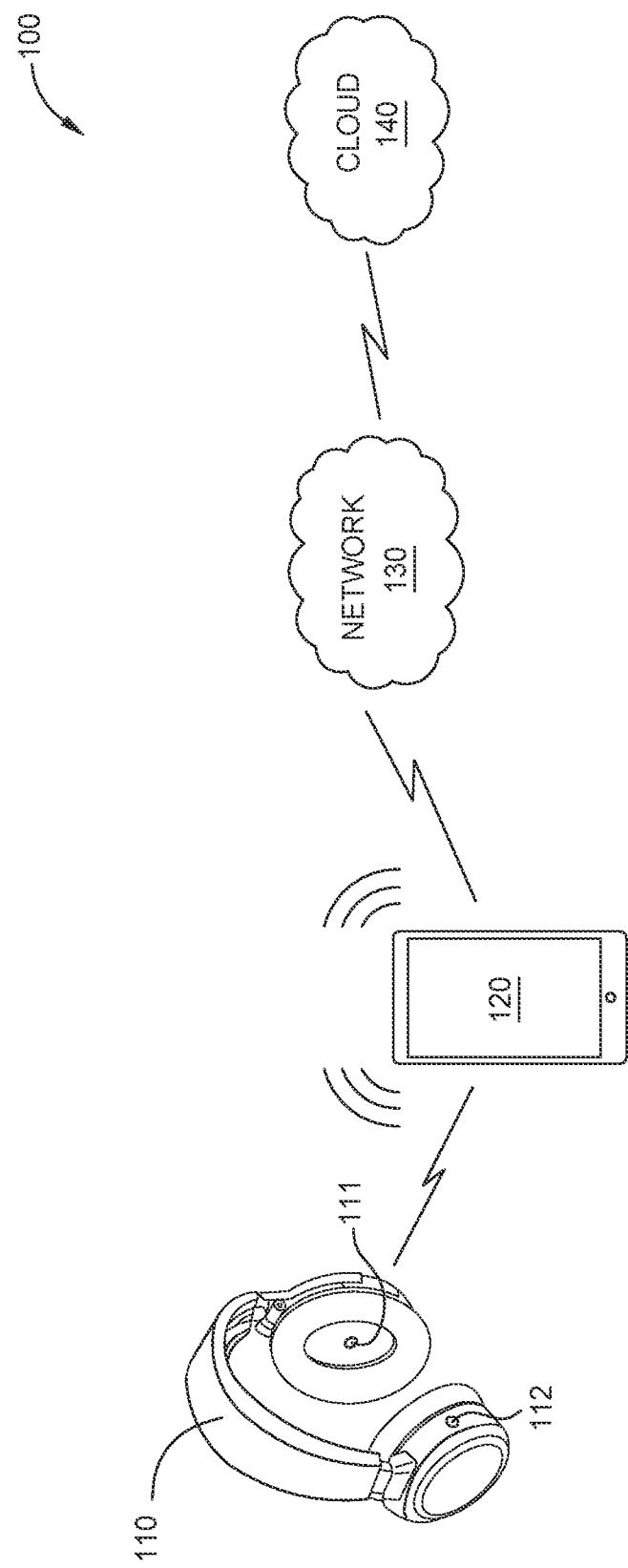
FIG. 1 illustrates an example system in which aspects of the present disclosure may be implemented.

The present disclosure provides processes, methods, systems, and devices for synchronizing a wirelessly transmitted (e.g., via Bluetooth) audio capture to an audio playback. For example, a user device, such as a smartphone or mobile computer, may transmit, via a wireless transmitter, an audio output to a wireless audio device, such as a Bluetooth headset or headphones. The user device may receive from the wireless audio device a feedback signal corresponding to the audio output played at the wireless audio device. The feedback signal may help the user device determine a delay between the playback of the audio output at the wireless audio device and the transmission of the audio output at the user device. The user device may further receive, from the wireless audio device, a captured audio and synchronize the captured audio with the audio output using the feedback signal. For example, the user device can mix and merge the captured audio with the audio output and save the combined data as a new file.

Audio capture to audio playback synchronization over a Bluetooth headphone is a complex problem because of delays involved in two Bluetooth audio streams: one audio stream of an output from the user device (such as a smartphone) to the wireless audio device (such as a headset), the other audio stream of a recording from the wireless audio device to the user device. This disclosure provides accurate modelling of the delays involved and various transportation delays in both audio streams. Very often, music and other audio-to-audio syncing applications rely on accurate mixing and merging two or more audio streams. The present disclosure provides methods for playing high quality music over standard A2DP Bluetooth profile and capture the vocal track, along with a reference track for synchronization in the form of the feedback mic stream.

In some instances, the audio playback may be a karaoke soundtrack, also known as an instrumental track or minus one track. The captured audio may be a user's singing recording in response to the karaoke soundtrack. In other instances, the audio playback may be part of a video clip, such as a sports game broadcast. The captured audio may be a user's commentary in response to the video clip. In these scenarios, accurate timing for the captured audio to match the playback is important.

The present disclosure provides benefits of determining or modeling both the output and input latencies during playback of some audio tracks and the captured audio generated in response to the playback. The present disclosure overcomes an existing deficiency in inaccurate or inconsistent modeling delays in Bluetooth audio transmissions or similar wireless transmissions involving delays. Due to the lack of accurate models, a captured audio in response to an existing sound track cannot be synchronized. For example, currently, karaoke often use wired connection to minimize delays and reduce jitter in audio received from wireless audio device.

The present disclosure provides methods and techniques that enable the use of Bluetooth microphones to capture audios and synchronize the captured audios with an existing sound track. In other words, in the karaoke example, devices using protocol may also be used for synchronizing the voice recording to the instrumental playback because the various delays in the system are accurately modeled, calculated, or otherwise determined. Other examples of the present disclosure include sports commentary, comedy commentary, precise voice tagging audio content, video dubbing, and interactive content for ordering based on advertisements.

In some aspects, the user device may be a computing device operable to play a multimedia document or a streamed broadcast. The wireless audio device may be a headset paired with the user device via a Bluetooth connection. The wireless audio device may include speakers and microphones. The speakers are configured to output the audio playback provided by the user device. The microphones may be placed at various locations: some near the speakers and some placed to capture voices of the user. The microphones near the speakers may be used to capture feedback signals that assist determination of a playback delay. The user device can synchronize the captured audios with the audio playback based on the playback delay. The wireless audio device is configured to concurrently send the captured audio to the user device while playing the audio playback received from the user device. The user device processes the captured audio for synchronization and to merge the captured audio and the audio playback. In aspects, the user device saves the combined audio as a new document, and transfers the new document to a desired destination, such as a server or a cloud storage.

The present disclosure does not have or otherwise rely on assumptions on the modeling of delays in the two-way audio communication. The disclosed method provides an accurate offset for the captured audio to align with the playback data (including the related audio output and the video clips). The mixed and/or merged content may be shared on social network platforms or saved in desired locations. The disclosed methods and techniques further improve wireless communication technology.

FIG. 1 illustrates an example system 100 in which aspects of the present disclosure are practiced. As shown, system 100 includes a wireless audio device 110 communicatively coupled with a user device 120. The wireless audio device 110 is illustrated as a headset that includes two or more speakers. The user device 120 is illustrated as a smartphone or a tablet computer.

In an aspect, the wireless audio device 110 include multiple microphones 111 and 112 to capture sound signals for different purposes. For example, the microphone 111 is positioned inside an earcup of the wireless audio device and next to an internal speaker in the earcup. The microphone 111 is configured to measure an output from the internal speaker. The output recorded by the microphone 111 may be transmitted to the user device 120, which can determine a delay by comparing the recorded output and the audio output transmitted to the wireless audio device. The microphone 112 is positioned outside the earcup and operable to record audio output of the user.

In an aspect, the headphones 110 include voice activity detection (VAD) circuitry capable of detecting the presence of speech signals (e.g. human speech signals) in a sound signal received by the microphones 112 of the headphones 110. For instance, the microphones 112 of the headphones 110 can receive ambient external sounds in the vicinity of the headphones 110, including speech uttered by the user. The sound signal received by the microphones 112 may have the speech signal mixed in with other sounds in the vicinity of the headphones 110. Using the VAD, the headphones 110 can detect and extract the speech signal from the received sound signal. In an aspect, the VAD circuitry can be used to detect and extract speech uttered by the user in order to facilitate a voice call, voice chat between the user and another person, or voice commands for a virtual personal assistant (VPA), such as a cloud based VPA. In other examples, detections or triggers can include self-VAD (only starting up when the user is speaking, regardless of whether others in the area are speaking), active transport (sounds captured from transportation systems), head gestures, buttons, target device based triggers (e.g., pause/un-pause from the phone), changes with input audio level, audible changes in environment, among others.

The wireless audio device 110 can further include hardware and circuitry including processor(s)/processing system and memory configured to implement one or more sound management capabilities or other capabilities including, but not limited to, noise cancelling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry.

In an aspect, the wireless audio device 110 is wirelessly connected to the user device 120 using one or more wireless communication methods including, but not limited to, Bluetooth, Wi-Fi, Bluetooth Low Energy (BLE), other RF-based techniques, or the like. In an aspect, the wireless audio device 110 includes a transceiver that transmits and receives data via one or more antennae in order to exchange audio data and other information with the user device 120.

In an aspect, the wireless audio device 110 includes communication circuitry capable of transmitting and receiving audio data and other information from the user device

120. The wireless audio device 110 also includes an incoming audio buffer, such as a render buffer, that buffers at least a portion of an incoming audio signal (e.g., audio packets) in order to allow time for retransmissions of any missed or dropped data packets from the user device 120. For example, when the wireless audio device 110 receives Bluetooth transmissions from the user device 120, the communication circuitry typically buffers at least a portion of the incoming audio data in the render buffer before the audio is actually rendered and output as audio to at least one of the transducers (e.g., audio speakers) of the wireless audio device 110. This is done to ensure that even if there are RF collisions that cause audio packets to be lost during transmission, that there is time for the lost audio packets to be retransmitted by the user device 120 before they have to be rendered by the wireless audio device 110 for output by one or more acoustic transducers of the wireless audio device 110.

The audio output device 110 is illustrated as headphones; however, the techniques described herein apply to other wireless audio devices, such as wearable audio devices, including any audio output device that fits around, on, in, or near an ear (including open-ear audio devices worn on the head or shoulders of a user) or other body parts of a user, such as head or neck. The wireless audio device 110 may take any form, wearable or otherwise, including standalone devices (including automobile speaker system), stationary devices (including portable devices, such as battery powered portable speakers), headphones, earphones, earpieces, headsets, goggles, headbands, earbuds, armbands, sport headphones, neckband, or eyeglasses.

In an aspect, the wireless audio device 110 is connected to the user device 120 using a wired connection, with or without a corresponding wireless connection. The user device 120 can be a smartphone, a tablet computer, a laptop computer, a digital camera, or other user device that connects with the wireless audio device 110. As shown, the user device 120 can be connected to a network 130 (e.g., the Internet) and can access one or more services over the network. As shown, these services can include one or more cloud services 140.

In an aspect, the user device 120 can access a cloud server in the cloud 140 over the network 130 using a mobile web browser or a local software application or "app" executed on the user device 120. In an aspect, the software application or "app" is a local application that is installed and runs locally on the user device 120. In an aspect, a cloud server accessible on the cloud 140 includes one or more cloud applications that are run on the cloud server. The cloud application can be accessed and run by the user device 120. For example, the cloud application can generate web pages that are rendered by the mobile web browser on the user device 120. In an aspect, a mobile software application installed on the user device 120 or a cloud application installed on a cloud server, individually or in combination, may be used to implement the techniques for low latency Bluetooth communication between the user device 120 and the wireless audio device 110 in accordance with aspects of the present disclosure. In an aspect, examples of the local software application and the cloud application include a gaming application, an audio AR application, and/or a gaming application with audio AR capabilities. The user device 120 may receive signals (e.g., data and controls) from the wireless audio device 110 and send signals to the wireless audio device 110.

It can be noted that although certain aspects of the present disclosure may discuss low latency Bluetooth communication between a smartphone and headphones for exemplary purposes, any portable user device and any wireless audio output device with similar capabilities can be interchangeably used in these aspects.

As noted in the above paragraphs, the incoming audio render buffer of a user device 120 receiving a Bluetooth audio stream dominates the end-to-end latency of the Bluetooth audio link. In certain aspects, the overall latency of audio output at the user device 120 is lowered by reducing the size of the render buffer at the wireless audio device 110 resulting in less data being buffered before it is rendered and played to the user. However, doing this all the time can result in unacceptably poor RF robustness and lead to excessive audio dropouts in many use cases, especially under challenging RF conditions. For example, where a user is listening to music on wireless audio device 110 via a Bluetooth audio stream while the user device 120 is in the user's pocket, the Bluetooth audio stream may have to travel through the user's body, thereby dictating a relatively large render buffer (e.g., 150 ms or greater) at the wireless audio device 110 to increase audio output robustness and reduce audio dropouts. However, the relatively large render buffer size provides increased audio output latency due to the related delay in playback until the buffer is full.

In certain aspects, a size of the render buffer at a user device can be selectively reduced in order to lower the latency related to audio output at the user device, based on a context of the use case in which the audio streaming is being used. For example, a reduced size of the Bluetooth render buffer is selected in response to detecting certain trigger events relating to use cases utilizing low latency communication of audio data. Thus, in some aspects, the techniques described herein include enabling a low latency mode when it is desired (e.g., in response to a trigger), and disabling the low latency mode at all other times (e.g., in response to removal of the initial trigger or in response to an additional trigger).

Figure 2A:
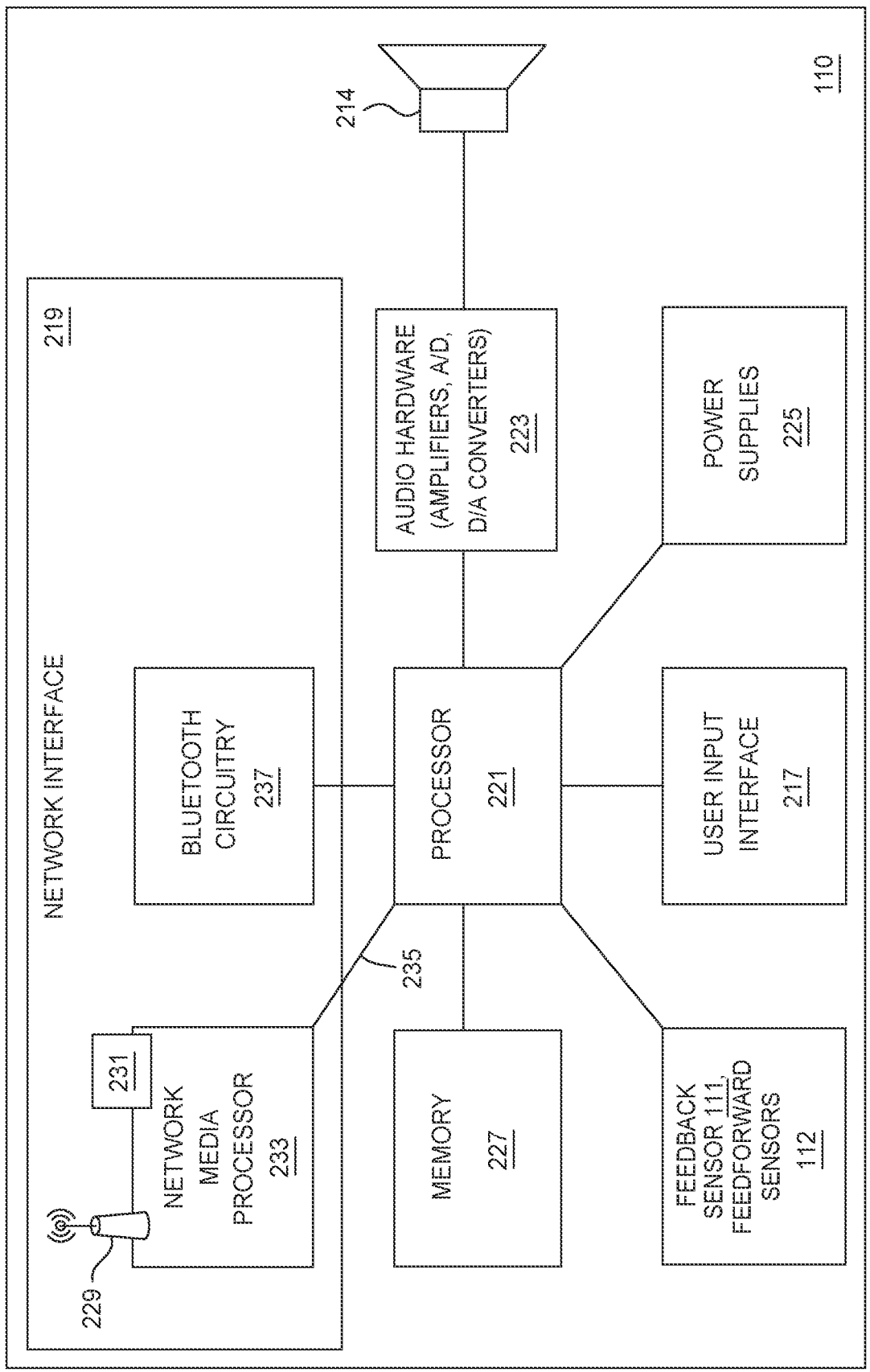
FIG. 2A illustrates an exemplary wireless audio device, in accordance with certain aspects of the present disclosure.

FIG. 2A illustrates an exemplary wireless audio device 110 and some of its components. Other components may be inherent in the wireless audio device 110 and not shown in FIG. 2A. For example, the wireless audio device 110 may include an enclosure that houses an optional graphical interface (e.g., an OLED display) which can provide the user with information regarding currently playing ("Now Playing") music.

The wireless audio device 110 includes one or more electro-acoustic transducers (or speakers) 214 for outputting audio. The wireless audio device 110 also includes a user input interface 217. The user input interface 217 can include a plurality of preset indicators, which can be hardware buttons. The preset indicators can provide the user with easy, one press access to entities assigned to those buttons. The assigned entities can be associated with different ones of the digital audio sources such that a single wireless audio device 110 can provide for single press access to various different digital audio sources.

Aspects primarily describe techniques in the context of feedback microphone(s) 111 (or other sensors) and feedforward microphones 112 (or other sensors) on a headset for synchronizing captured audios using the feedforward microphones 112 and a corresponding playback at the user device 120. The feedback microphone(s) 111 is configured to accurately measure the output of the speaker(s) 214, which is used as a feedback signal (referred to as $A_{fb}$, to be used in discussions below). The processor 221 may return the feedback signal $A_{fb}$ to the user device 120 or may perform post processing, such as filtering, compression, multiplexing, or other computations that benefit subsequent transmission and/or processing, before returning the post processed feedback signal $A_{fb}$ to the user device 120. The feedforward microphones 112 are configured to capture or record at least a vocal soundtrack by the user, as well as other surrounding sound not provided by the speaker(s) 214. The captured audio captured by the feedforward microphones 112 is denoted $A_{ff}$ herein. In some aspects, the captured audios $A_{ff}$ captured by the feedforward microphones 112 are transported by Bluetooth to the user device 120.

As shown in FIG. 2A, the wireless audio device 110 includes an acoustic driver or speaker 214 to transduce audio signals to acoustic energy through the audio hardware 223. The wireless audio device 110 also includes a network interface 219, at least one processor 221, audio hardware 223, power supplies 225 for powering the various components of the wireless audio device 110, and memory 227. In an aspect, the processor 221, the network interface 219, the audio hardware 223, the power supplies 225, and the memory 227 are interconnected using various buses 235, and several of the components can be mounted on a common motherboard or in other manners as appropriate.

The network interface 219 provides for communication between the wireless audio device 110 and other electronic user devices via one or more communications protocols. The network interface 219 provides either or both of a wireless network interface 229 and a wired interface 231 (optional). The wireless interface 229 allows the wireless audio device 110 to communicate wirelessly with other devices in accordance with a wireless communication protocol such as IEEE 802.11. The wired interface 231 provides network interface functions via a wired (e.g., Ethernet) connection for reliability and fast transfer rate, for example, used when the wireless audio device 110 is not worn by a user. Although illustrated, the wired interface 231, is optional.

In certain aspects, the network interface 219 includes a network media processor 233 for supporting Apple AirPlay® and/or Apple Airplay® 2. For example, if a user connects an AirPlay® or Apple Airplay® 2 enabled device, such as an iPhone or iPad device, to the network, the user can then stream music to the network connected audio playback devices via Apple AirPlay® or Apple Airplay® 2. Notably, the audio playback device can support audio-streaming via AirPlay®, Apple Airplay® 2 and/or DLNA's UPnP protocols, and all integrated within one device.

All other digital audio received as part of network packets may pass straight from the network media processor 233 through a USB bridge (not shown) to the processor 221 and runs into the decoders, DSP, and eventually is played back (rendered) via the electro-acoustic transducer(s) 214.

The network interface 219 can further include a Bluetooth circuitry 237 for Bluetooth applications (e.g., for wireless communication with a Bluetooth enabled audio source such as a smartphone or tablet) or other Bluetooth enabled speaker packages. In some aspects, the Bluetooth circuitry 237 may be the primary network interface 219 due to energy constraints. For example, the network interface 219 may use the Bluetooth circuitry 237 solely for mobile applications when the wireless audio device 110 adopts any wearable form. For example, BLE technologies may be used in the wireless audio device 110 to extend battery life, reduce package weight, and provide high quality performance without other backup or alternative network interfaces.

In an aspect, the network interface 219 supports communication with other devices using multiple communication protocols simultaneously at one time. For instance, the wireless audio device 110 can support Wi-Fi/Bluetooth coexistence and can support simultaneous communication using both Wi-Fi and Bluetooth protocols at one time. For example, the wireless audio device 110 can receive an audio stream from a smart phone using Bluetooth and can further simultaneously redistribute the audio stream to one or more other devices over Wi-Fi. In an aspect, the network interface 219 may include only one RF chain capable of communicating using only one communication method (e.g., Wi-Fi or Bluetooth) at one time. In this context, the network interface 219 may simultaneously support Wi-Fi and Bluetooth communications by time sharing the single RF chain between Wi-Fi and Bluetooth, for example, according to a time division multiplexing (TDM) pattern.

Streamed data may pass from the network interface 219 to the processor 221. The processor 221 can execute instructions (e.g., for performing, among other things, digital signal processing, decoding, and equalization functions), including instructions stored in the memory 227. The processor 221 can be implemented as a chipset of chips that includes separate and multiple analog and digital processors. The processor 221 can provide, for example, for coordination of other components of the audio wireless audio device 110, such as control of user interfaces.

In certain aspects, the memory 227 stores software/firmware related to protocols and versions thereof used by the wireless audio device 110 for communicating with other networked devices. For example, the software/firmware governs how the wireless audio device 110 communicates with other devices for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment and playback of an audio stream. In an aspect, the memory can also store various codecs supported by the speaker package for audio playback of respective media formats. In an aspect, the software/firmware stored in the memory can be accessible and executable by the processor 221 for synchronized playback of audio with other networked speaker packages.

In certain aspects, the protocols stored in the memory 227 may include BLE according to, for example, the Bluetooth Core Specification Version 5.2 (BT5.2). The wireless audio device 110 and the various components therein are provided herein to sufficiently comply with or perform aspects of the protocols and the associated specifications. For example, BT5.2 includes enhanced attribute protocol (EATT) that supports concurrent transactions. A new L2CAP mode is defined to support EATT. As such, the wireless audio device 110 includes hardware and software components sufficiently to support the specifications and modes of operations of BT5.2, even if not expressly illustrated or discussed in this disclosure. For example, the wireless audio device 110 may utilize LE Isochronous Channels specified in BT5.2.

The processor 221 provides a processed digital audio signal to the audio hardware 223 which includes one or more digital-to-analog (D/A) converters for converting the digital audio signal to an analog audio signal. The audio hardware 223 also includes one or more amplifiers which provide amplified analog audio signals to the electroacoustic transducer(s) 214 for sound output. In addition, the audio hardware 223 can include circuitry for processing analog input signals to provide digital audio signals for sharing with other devices, for example, other speaker packages for synchronized output of the digital audio.

The memory 227 can include, for example, flash memory and/or non-volatile random access memory (NVRAM). In some aspects, instructions (e.g., software) are stored in an information carrier. The instructions, when executed by one or more processing devices (e.g., the processor 221), perform one or more processes, such as those described elsewhere herein. The instructions can also be stored by one or more storage devices, such as one or more computer or machine-readable mediums (for example, the memory 227, or memory on the processor). The instructions can include instructions for performing decoding (i.e., the software modules include the audio codecs for decoding the digital audio streams), as well as digital signal processing and equalization. In certain aspects, the memory 227 and the processor 221 may collaborate in data acquisition and real time processing with the feedback microphone 111 and feedforward microphones 112.

Figure 2B:
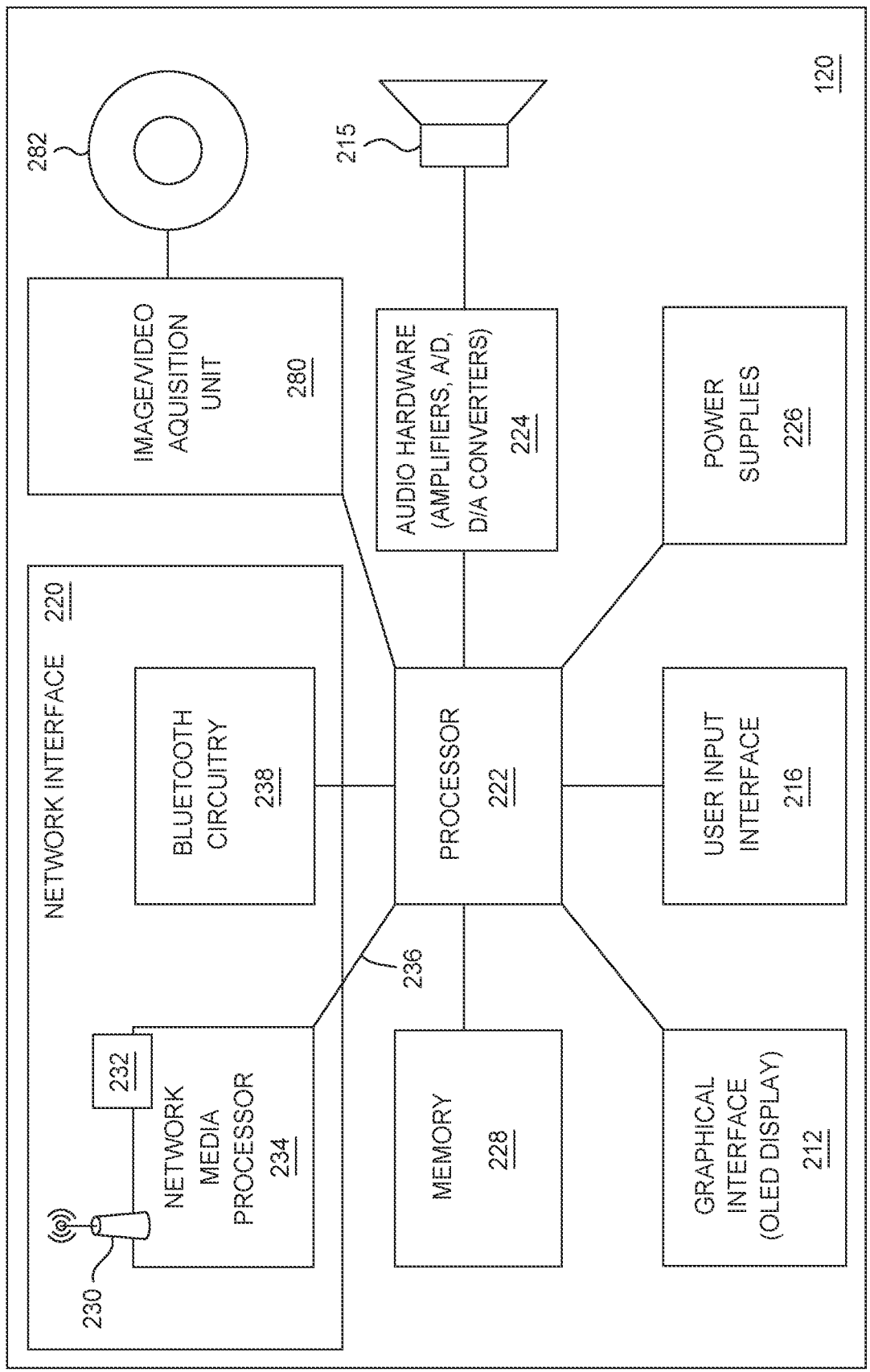
FIG. 2B illustrates an exemplary user device, in accordance with certain aspects of the present disclosure.

FIG. 2B illustrates an exemplary user device 120, such as a smartphone or a mobile computing device, in accordance with certain aspects of the present disclosure. Some components of the user device 120 may be inherent and not shown in FIG. 2B. For example, the user device 120 may include an enclosure. The enclosure may house an optional graphical interface 212 (e.g., an OLED display) as shown. The graphical interface 212 provides the user with information regarding currently playing ("Now Playing") music or video. The user device 120 includes one or more electro-acoustic transducers 215 for outputting audio. The user device 120 may also include a user input interface 216 that enables user input.

The user device 120 also includes a network interface 220, at least one processor 222, audio hardware 224, power supplies 226 for powering the various components of the user device 120, and a memory 228. In an aspect, the processor 222, the graphical interface 212, the network interface 220, the audio hardware 224, the power supplies 226, and the memory 228 are interconnected using various buses 236, and several of the components can be mounted on a common motherboard or in other manners as appropriate. In some aspects, the processor 222 of the user device 120 is more powerful in terms of computation capacity than the processor 221 of the wireless audio device 110. Such difference may be due to constraints of weight, power supplies, and other requirements. Similarly, the power supplies 226 of the user device 120 may be of a greater capacity and heavier than the power supplies 225 of the wireless audio device 110.

The network interface 220 provides for communication between the user device 120 and the wireless audio device 110, as well as other audio sources and other wireless speaker packages including one or more networked wireless speaker packages and other audio playback devices via one or more communications protocols. The network interface 220 can provide either or both of a wireless interface 230 and a wired interface 232 (optional). The wireless interface 230 allows the user device 120 to communicate wirelessly with other devices in accordance with a wireless communication protocol such as IEEE 802.11. The wired interface 232 provides network interface functions via a wired (e.g., Ethernet) connection.

In certain aspects, the network interface 220 can also include a network media processor 234 and Bluetooth circuitry 238, similar to the network media processor 233 and Bluetooth circuitry 237 in the wireless audio device 110 in FIG. 2A. Further, in aspects, the network interface 220 supports communication with other devices using multiple communication protocols simultaneously at one time, as described with respect to the network interface 219 in FIG. 2A.

All other digital audio received as part of network packets comes straight from the network media processor 234 through a USB bridge 236 to the processor 222 and runs into the decoders, DSP, and eventually is played back (rendered) via the electro-acoustic transducer(s) 215.

The user device 120 may also include an image or video acquisition unit 280 for capturing image or video data. For example, the image or video acquisition unit 280 may be connected to one or more cameras 282 and able to capture still or motion images. The image or video acquisition unit 280 may operate at various resolutions or frame rates according to a user selection. For example, the image or video acquisition unit 280 may capture 4K videos (e.g., a resolution of 3840 by 2160 pixels) with the one or more cameras 282 at 30 frames per second, FHD videos (e.g., a resolution of 1920 by 1080 pixels) at 60 frames per second, or a slow motion video at a lower resolution, depending on hardware capabilities of the one or more cameras 282 and the user input. The one or more cameras 282 may include two or more individual camera units having respective lenses of different properties, such as focal length resulting in different fields of views. The image or video acquisition unit 280 may switch between the two or more individual camera units of the cameras 282 during a continuous recording.

Captured audio or audio recordings, such as the voice recording captured at the wireless audio device 110, may pass from the network interface 220 to the processor 222. The processor 222 executes instructions within the wireless speaker package (e.g., for performing, among other things, digital signal processing, decoding, and equalization functions), including instructions stored in the memory 228. The processor 222 can be implemented as a chipset of chips that includes separate and multiple analog and digital processors. The processor 222 can provide, for example, for coordination of other components of the audio user device 120, such as control of user interfaces and applications. The processor 222 provides a processed digital audio signal to the audio hardware 224 similar to the respective operation by the processor 221 described in FIG. 2A.

In certain aspects, the memory 228 stores software/firmware related to protocols and versions thereof used by the user device 120 for communicating with other networked devices. For example the software/firmware governs how the user device 120 communicates with other devices for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment and playback of an audio stream. In an aspect, the memory stores various codecs supported by the speaker package for audio playback of respective media formats. In an aspect, the software/firmware stored in the memory is accessible and executable by the processor 222 for synchronized playback of audio with other networked speaker packages.

The memory 228 can include, for example, flash memory and/or non-volatile random access memory (NVRAM). In aspects, instructions (e.g., software) are stored in an information carrier. The instructions, when executed by one or more processing devices (e.g., the processor 222), perform one or more processes, such as those described herein. The instructions can also be stored by one or more storage devices, such as one or more computer or machine-readable mediums (for example, the memory 228, or memory on the processor 222). The instructions can include instructions for performing decoding (i.e., the software modules include the audio codecs for decoding the digital audio streams), as well as digital signal processing and equalization.

Example Synchronization of Bluetooth Audio Capture to Audio Playback

Aspects of the present disclosure provide techniques to synchronize data captured at a wireless audio device with data playback at a user device. In general, the user device may output a data playback to the wireless audio device. Upon receiving the output from the user device, the wireless audio device gathers a feedback signal for determining a delay associated with the data playback. Further, in response to the data playback, the wireless audio device performs data capture. The wireless audio device then transmits the captured data to the user device. The user device determines the delay associated with the data playback based on the feedback signal from the wireless audio device and uses the delay to synchronize the captured data with the data playback. In one example, the data playback may be an audio soundtrack extracted from an audio or video file. In other examples, the data playback may include data streamed in real time. The corresponding data capture may be a captured audio such as a voice recording, a commentary, dubbing, or other interactive content.

In aspects, the notion of synchronizing the data capture with the data playback allows for adjusting either the data capture or the data playback to realize synchronization. For example, in some cases, synchronizing the data capture with the data playback includes aligning the data capture to the data playback, which serves as a reference. In other cases, synchronizing the data capture with the data playback includes aligning the data playback to the data capture, even though the data capture is produced in response to the data playback. The present disclosure uses "synchronize . . . to . . . " interchangeably with "align . . . to . . . ."

As an example, aspects of the present disclosure may be used in a karaoke application. Conventional karaoke often relies on wired systems to provide a consistent and known amount of delay, thus enabling reliable synchronization of the singer's voices with the instrumental soundtrack. In some examples, known wireless systems do not reduce or remove delays. Instead, they rely on the singer to adjust to the instrumental track by singing in advance (of known songs) based on tempo and/or feelings. Even if some wireless systems attempt to address delays, the systems use a constant delay value (about 100s of ms) entered by the user. Use of a constant delay value may not be accurate and causes the captured audio to be out-of-sync with the instrumental soundtrack. The disclosed techniques allow for accurate monitoring and measurement of various delays in the playback-recording system to synchronize a singer's recording to the instrumental soundtrack precisely, even if some delays may be variable during operation. Furthermore, the disclosed techniques are applicable to Bluetooth or similar short-range wireless communications, thus enabling the use of many low energy audio devices as the wireless audio device.

In some examples, lead vocals of a karaoke soundtrack may be captured. The user device may host a video-based karaoke application, which displays lyrics and records the user's singing. The recorded singing is then saved with the playback audio in the karaoke application and may be shared on music sharing or social networking platforms. The playback audio may be saved locally in local storage, or may be streamed to the user device as the user sings along. The disclosed techniques determine delays based on feedback signals and synchronize the Bluetooth transmitted recorded audio with the karaoke audio/video, as discussed in the four examples below.

Example I: Synchronization Based on Feedback Signal of Wireless Audio Device

In a first example, the wireless audio device is configured to return a feedback signal captured by a feedback microphone, such as the feedback microphone 111. As discussed above in FIG. 1, the wireless audio device, such as the wireless audio device 110, may include a microphone capturing the sounds inside the ear-cup or ear-canal, referred to as the feedback microphone. The wireless audio device also has at least one external facing microphone for feedforward and communication, referred to as a feedforward microphone 112.

The feedback microphone is positioned to capture the audio played by the speaker driver. For example, the feedback microphone maybe positioned to listen inside the ear-cup or ear-canal, as shown in FIG. 1. This means that the feedback microphone not only captures the Karaoke track that is played by the speaker driver of a headphone/ear-bud; but the feedback microphone (along with the feedforward microphones) can also pick up the wearer's voice when the wearer sings (referred to as the vocal track). In other examples, the feedback microphones are positioned in ear-buds. In yet other examples, the feedback microphones are part of open-ear audio devices. Distinct from the feedforward microphone, the feedback microphone does not require high specification audio quality (such as frequency range or sampling bandwidth, or not of a music grade), but focuses on timing determination, such as identifying a location of a soundtrack for identifying delays or latencies.

In some aspects, the described techniques use data from the user device and the wireless audio device to align a captured audio at the wireless audio device to an audio output from the user device, based on an algorithm using the following data sources: an input video clip (denoted $V_k$) run at the user device, the input video clip includes an audio output (denoted $A_k$) in synchrony with the video clip; a captured audio captured by one or more feedforward microphones (denoted $A_{ff}$); and audio feedback signals captured by one or more feedback microphones (denoted $A_{fb}$). The captured audio $A_{ff}$ and the feedback signals $A_{fb}$ may be transmitted by Bluetooth from the wireless audio device to the user device. In some examples, the captured audio $A_{ff}$ includes a primarily vocal track During operation, there are multiple latencies involved between the time when the video $V_k$ is decoded for playback at the user device and when the captured audio $A_{ff}$ for the corresponding position in video are received by the user device from the wireless audio device.

To accurately ascertain the delay between the transmission of the audio output in the user device and the audio output at the speakers of the wireless audio device, the feedback microphones in the wireless audio device are configured to capture the feedback signal $A_{fb}$ and transmit the feedback signal to the user device, such as a mobile application running on the user device. The feedback signal $A_{fb}$ records a mix of the audio output $A_k$ played by the speakers of the wireless audio device (i.e., a delayed output of the audio output sent from the user device, denoted $A_{ks}$) in the wireless audio device, and the captured audio $A_{ff}$. The delayed audio output $A_{ks}$ is a function of $A_k$ and latencies (denoted as time, t, in general) from the initial transmission of the audio output in the user device to the actual audio output by the speakers of the wireless audio device. Therefore, the feedback signal is a function of the delay t, the audio output $A_k$, and the captured audio $A_{ff}$, i.e., $A_{fb}=f(t, A_k, A_{ff})$. This shows that latencies that change in time and a static number would not be sufficient or accurate in describing the delay between the transmission of the audio output in the user device and the audio output at the speakers of the wireless audio device.

Figure 3:
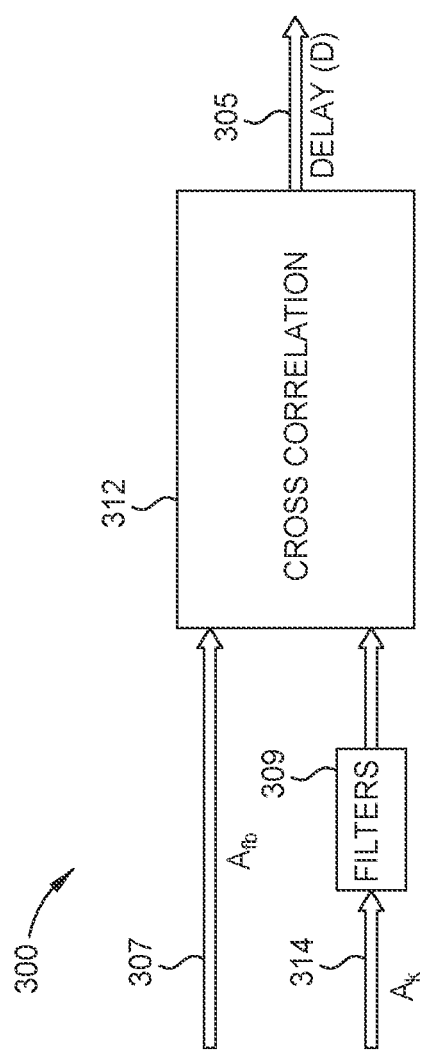
FIG. 3 illustrates an example block diagram of determining a delay, in accordance with certain aspects of the present disclosure.

Referring to FIG. 3, cross-correlation 312 of the feedback signal 307 ($A_{fb}$) and the audio output 314 ($A_k$ or $A_{ks}$) is performed to calculate or otherwise ascertain the delay 305 (denoted as D) between the transmission of the audio output in the user device and the audio output at the speakers of the wireless audio device. For example, with $A_k$ being a common entity in both the $A_{ks}$ and $A_{fb}$, the cross-correlation may be performed between $A_{ks}$ and $A_{fb}$ to determine the delay D between $A_k$ and $A_{fb}$.

In addition to performing a one-step cross-correlation of $A_{fb}$ and $A_k$, other data processing may be performed to improve the accuracy or efficiency of identifying the delay D. For example, as shown in FIG. 3, filters 309 may be applied to the audio output 314. The filters 309 may be equivalent to the audio processing performed and the typical response within the earcup for audio on $A_k$ before the cross-correlation 312. In aspects, this is analogous to inverse acoustic echo cancellation or techniques associated therewith. As such, applying the filters 309 may provide a more accurate $A_{ks}$.

Figure 4:
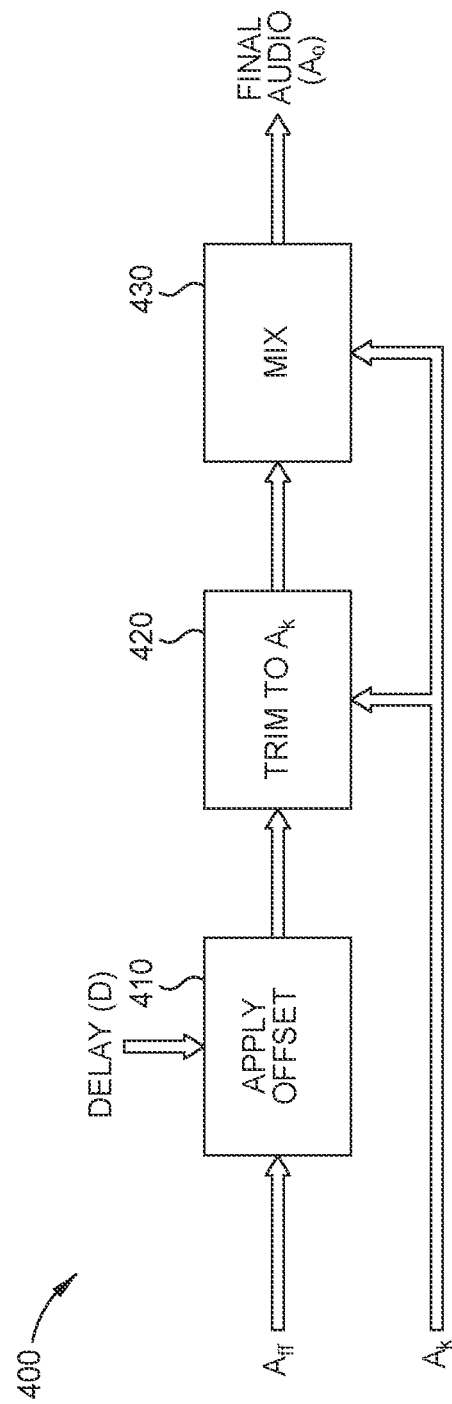
FIG. 4 illustrates an example block diagram of mixing and synchronizing two audio pieces into a final audio output, in accordance with certain aspects of the present disclosure.

Turning now to FIG. 4, a block diagram 400 illustrates using the determined delay D to determine a synchronized final audio $A_o$. In general, (e.g., when other latencies are much smaller than D and may be neglected), the determined delay D is applied to the captured audio $A_{ff}$, to align $A_{ff}$ with $A_k$. As shown, using the captured audio $A_{ff}$ and the audio output $A_k$ as input values, the user device first applies the delay D in an offset calculation block 410. The result of 410 shifts the captured audio $A_{ff}$ and removes the delay D. In block 420, the result of 410 is trimmed according to the audio output $A_k$. For example, the trimming at 420 avoids $A_{ff}$, due to the shifting accounted for the delay D, exceeds the time window of $A_k$.

In block 430, the trimmed $A_{ff}$ is mixed with the audio output $A_k$ to produce a final audio $A_o$. For example, the user device may produce the final audio $A_o$ as a new synchronized soundtrack that includes both the instrumental soundtrack of $A_k$ and the vocal soundtrack of $A_{ff}$. The final audio $A_o$ may be saved standalone or used for subsequent processes as described in FIG. 5.

Figure 5:
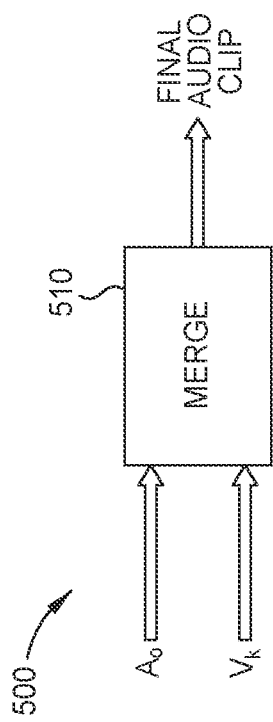
FIG. 5 illustrates an example block diagram of merging an audio output with a video file, in accordance with certain aspects of the present disclosure.

FIG. 5 illustrates an example block diagram 500 of merging the final audio $A_o$ with the video $V_k$ in block 510. Because $A_k$ is presumed to be synchronized with or aligned to the video $V_k$, the aligned $A_{ff}$ may be trimmed to a final composition (e.g., mixing and merging) with $V_k$. As shown in FIG. 5, for example, the final audio $A_o$ includes trimmed $A_{ff}$ aligned with the audio output $A_k$, which is in synchrony with the video $V_k$. Therefore, the merged final video clip includes a final composition that includes a time delayed version of $A_{ff}$ as well as the non-delayed version of $A_k$ and $V_k$.

Figure 6:
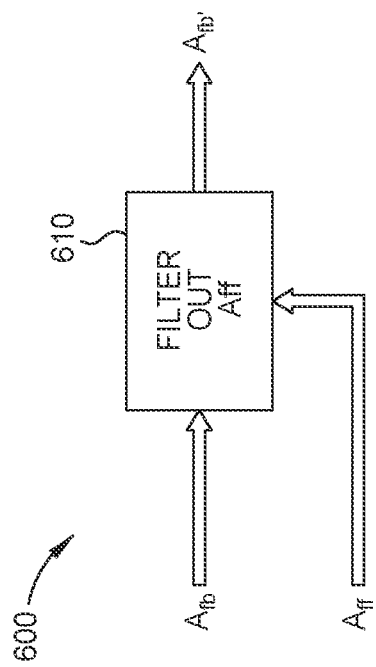
FIG. 6 illustrates an example block diagram of determining a feedback signal, in accordance with certain aspects of the present disclosure.

In another example, as shown in FIG. 6, additional or alternative data processing may be performed to the feedback signal $A_{fb}$. As shown, block 610 performs operations to filter out $A_{ff}$. For example, the block 610 can spectrally remove $A_{ff}$ from $A_{fb}$, and output a filtered feedback signal $A_{fb}'$ for use as the input for cross-correlation. The filtered feedback signal $A_{fb}'$ improves the cross-correlation process in FIG. 3. In some aspects, the removal of $A_{ff}$ from $A_{fb}$ can be improved using multiple methods including beamforming using two or three microphone pairs that can be streamed to the user device.

Other processes may be performed in place of the filtering shown in FIG. 6. For example, instead of removing $A_{ff}$, wind noise reduction may be performed to improve the correlation process in FIG. 3. Furthermore, the techniques discussed can be used to support a near-real-time broadcast by delaying the output stream (e.g., $V_k$ and $A_k$) by a fixed delay, such as a known delay for 1 or 2 seconds long. In such situations, the compensation of the known delay may allow the synchronization of $A_k$ and $A_{ff}$ to be performed in near-real time, and compose the output stream (e.g., synchronizing $A_o$ and $V_k$) by fully compensating the roundtrip delay between the user device and the wireless audio device.

In an example, applicable formats for the data in the synchronization process are shown in Table 1 below.

| Audio Signal Identifier | Example File Format | Description |
| --- | --- | --- |
| $A_k$ | Karaoke-Ak.mp3 | Original source audio track (i.e., karaoke track) that is played back over A2DP. |
| $A_{fb}$ | Afb.mp3 | Audio captured from the feedback microphone. |
| $A_{ff}$ | VocalTrack-Aff.mp3 | Audio captured from the feedforward microphones. |
| $A_o$ | MergedOutput-Ao.mp3 | Audio output with the $A_{ff}$ shifted (according the sync delay D determined using the feedback signal $A_{fb}$, with applied gain and mixed with $A_k$. |

In some aspects, an example program for determining the synchronization techniques described above is shown in the example codes below.

```
clear;
%% Open the input files
rootFolder = './';
karaokeFile = [rootFolder 'Karaoke-Ak.mp3'];
ffFile = [rootFolder 'FF-EQ.wav'];
fbFile = [rootFolder 'FB-EQ.wav'];
[karaoke,fsK] = audioread(karaokeFile);
[ff, fsFF] = audioread(ffFile);
[fb, fsFB] = audioread(fbFile);
%% Resample the karaoke track, if needed
if (fsK ~= fsFB)
  karaoke = resample(karaoke, fsFB, fsK);
  fsK = fsFB;
end
%% cross-correlate the karaoke track with fb track (left-channel)
[l1,lagsL1] = xcorr(karaoke(:,1),fb(:,1));
```

```
[l2,lagsL2] = xcorr(fb(:,1),karaoke(:,1));
[~,idxL1] = max(l1);
[~,idxL2] = max(l2);
%% cross-correlate the karaoke track with fb track (right-channel)
[r1,lagsR1] = xcorr(karaoke(:,2),fb(:,2));
[r2,lagsR2] = xcorr(fb(:,2),karaoke(:,2));
[~,idxR1] = max(r1);
[~,idxR2] = max(r2);
%% Determine the delay to use and Print the salient numbers
delayInSamples = fix((lagsL2(idxL2) + lagsR2(idxR2))/2)
delay = delayInSamples/fsK
%% Clip, shift, Apply Gain and mix
[samplesK,channelsK] = size(karaoke)
[samplesF,channelsF] = size(ff)
outputSamples = min(samplesK, samplesF-delayInSamples)
output = karaoke(1:outputSamples, :) +
ff(delayInSamples:(delayInSamples+outputSamples-1),:).*8;
%% Write the output WAV file
outputFile = [rootFolder 'MergedOutput.wav'];
audiowrite(outputFile, output, fsK)
```

Although Example I provides detailed examples for each variable, parameter, and/or function for each data processing steps, similar or equivalent data processing steps with different reference symbols, convertible values, or other filtering or mixing processes are equally applicable.

Example II: Synchronization Based on Returned Audio Stream

Example II provides another example of synchronizing data captured at a wireless audio device with data playback at a user device. In this example, instead of using the feedback signal captured by the feedback microphone at the wireless audio device, a device specific value (e.g., a pre-calibrated or measured value) is used as the feedback signal. For example, the wireless audio device and the user device can loop back an audio output stream after all processing in the device to measure the device specific value, which depends on hardware configurations and is expected to remain a constant value with negligible random errors. For example, the user device and the wireless audio device may loop back an advanced audio distribution profile (e.g., A2DP) stream for determining the device specific value to use as the feedback signal. In this example, the device specific value can take the place of $A_{fb}$ in the above algorithm and indicate hardware delays that include the delay D.

In this example, instead of constantly measuring, monitoring, and/or determining the feedback signal as a function of the delay t, the audio output $A_k$, and the captured audio $A_{ff}$, i.e., $A_{fb}=f(t, A_k, A_{ff})$, the feedback signal accounts for the system delays as a function of hardware configuration. Thus, the main difference between Example I and Example II is that Example II uses product specific values for the delays between the stage in the pipeline at which the inbound music is looped back and the actual playback of the audio through the speaker drivers. This hardware specific delay varies based on different product architectures.

Example III: Synchronization Based on Returned Time Codes

Example III provides yet another example of synchronizing data captured at a wireless audio device with data playback at a user device. In cases where more control is desired over an audio distribution (e.g., A2DP) process, the user device or the wireless audio device may generate and append a timecode to the audio output or the captured audio, respectively, to provide timing information for every audio frame. For example, the wireless audio device may provide a timecode at the start of an A2DP session for every audio frame being transmitted back by to the user device, such that the user device may perform synchronization based on the provided time code.

In some examples, when the mobile application of the user device has accurate information of the timecode since the start of the A2DP session for the audio output $A_k$, then when $A_{ff}$ is received along with the return timecode, $A_{ff}$ can be accurately synchronized with $A_k$ and thus $V_k$ using the timecode.

In some examples, the mobile application of the user device may require either implementing a new protocol or having a better control over the audio distribution process. For example, the new protocol implements including time information, such as a timestamp or a timecode, to the data captured. Although the time information itself does not address, monitor, or measure various delays in connection between the user device and the wireless audio device, the time information provides a reference for deriving such delays. For example, an average delay may be calculated and used as a feedback signal in the algorithm presented in Example I.

Example IV: Synchronization Based on Isochronous Channels in LE Audio

Example IV provides another example of synchronizing data capture at a wireless audio device with data playback at a user device. In some cases, Bluetooth low energy audio (LE Audio) may include isochronous channels for communication. Such isochronous channels may present a constant presentation delay for an existing audio track (e.g., $A_k$).

The wireless audio device may use the techniques presented in Example I and Example II above in combination with the known constant delay of the isochronous channels. Consequently, the audio output $A_k$ may be transmitted to the wireless audio device via the isochronous channels and synchronized with the $A_{ff}$ recorded at the wireless audio device.

In some examples, an isochronous channel may provide an accurate presentation of a predictable delay that allows the user device to process $A_{ff}$. In a more bandwidth efficient approach, the delay of the speaker driver is known, and, for example, can be addressed before using the feedback signal to calculate final audio $A_o$. For example, $A_{ff}$ may be directly used for mixing without being processed for the shifting and trimming processes, such as those presented in blocks 410 and 420 of FIG. 4.

Given the constant isochronous channel delay, the user device may set a round-trip delay before sending out the audio output to optimize synchronization. For example, the round-trip delay may be within twice the maximum presentation delay defined by Bluetooth Core Specification 5.2. As such, the presentation delay for a microphone's audio frame from the wireless audio device can be determined as the application specified round-trip delay minus the presentation delay that the application sets for the audio frame sent from the user device to the wireless audio device. That is, the return delay associated with $A_{fb}$ is determined based on: $D_{app\_rt}$–D. The return delay is calculated using the difference between the round-trip delay $D_{app\_rt}$ and the transmission delay D.

The isochronous channels based on the Bluetooth Core Specification 5.2 allow both $D_{app\_rt}$ and D to be constant in some hardware configurations. When the microphone frame (part of $A_{ff}$) reaches the application from the wireless audio device to the user device, the application can thus precisely determine when that frame was captured by the headphones (e.g., $A_{ff}-A_{fb}=A_{ff}+D \to D_{app\_rt}$). As a result, the application in the user device may automatically synchronize $A_{ff}$ with the $A_k$ and save processing resources. In other cases, when the isochronous channels are not available, the user device may resume using feedback signals of Example I to determine $A_{fb}$.

Figure 7:
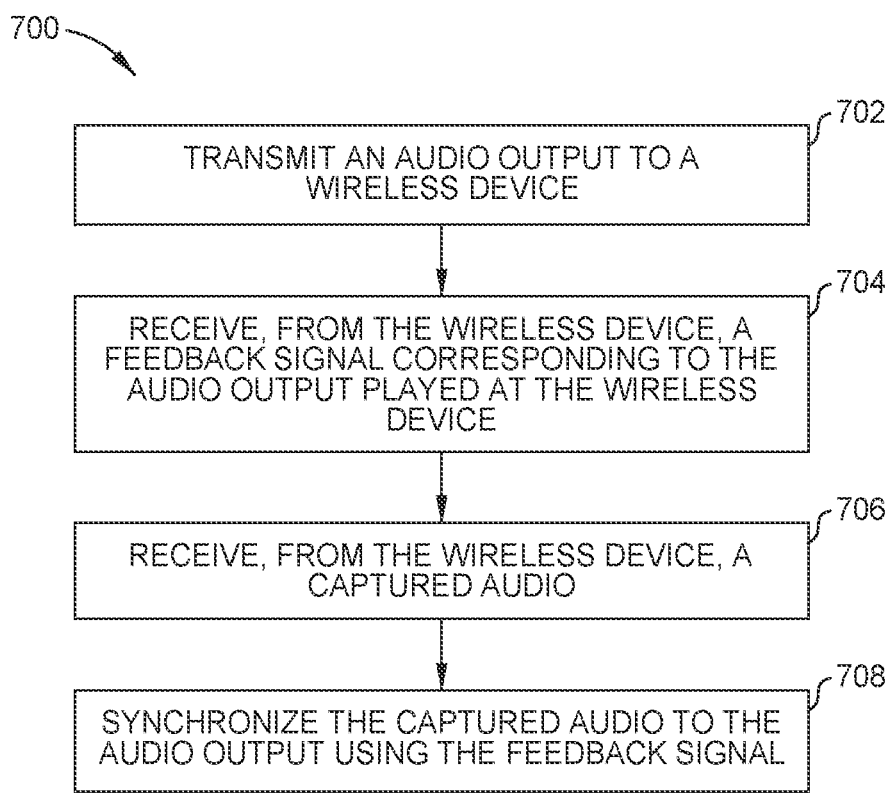
FIG. 7 is a flow diagram illustrating example operations that may be performed by a user device, in accordance with certain aspects of the present disclosure.

FIG. 7 is a flow diagram illustrating example operations 700 that may be performed by a user device. For example, the example operations 700 may be performed by the user device 120 of FIG. 1 or FIG. 2B when transmitting audio output to and receiving captured audio from the wireless audio device 110.

The example operations 700 begin, at 702, by transmitting, via a wireless transmitter, an audio output to a wireless audio device. At 704, the user device receives, from the wireless audio device, a feedback signal corresponding to the audio output played at the wireless audio device. At 706, the user device receives a captured audio from the wireless audio device. At 708, the user device synchronizes the captured audio with the audio output using the feedback signal.

In some cases, the user device determines, based on the feedback signal, a transmission delay between the audio output transmitted by the user device and an audio playback at the wireless audio device. For example, the audio playback at the wireless audio device may be delayed due to wireless connection latencies, processing latencies in the wireless audio device, and response latencies at the speakers of the wireless audio device, among others. The user device may further determine a return delay between a transmission of the captured audio by the wireless audio device and the reception of the captured audio at the user device. For example, the wireless audio device may record, encode, multiplex, and send the captured audio captured by one or more microphones (such as a pair of stereo microphones). Such data processing may cause delay. In other examples, the delay may also include filtering or noise reduction, among other post processing.

In some aspects, determining the transmission delay includes performing a cross correlation between the feedback signal and the audio output. In some aspects, the audio output is filtered before performing the cross correlation between the feedback signal and the audio output. Based on the identified transmission delay, the captured audio may be trimmed to the audio output. For example, the captured audio is trimmed within the time window of the audio output, such as by removing a portion of the captured audio outside of the time window of the audio output.

In some aspects, the user device may mix the trimmed captured audio and the audio output to output a final audio. The mixing of the two soundtracks produces one synchronized soundtrack. For example, the mixing operation may not be reversible. The mixed final audio may be further processed, such as encoding or decoding. The mixed final audio may include two or more channels. In some cases, the captured audio and the audio output have a common number of channels (such as left and right, or a 5.1 surround-sound). The mixing operation combines data of corresponding channels. In other cases, the captured audio may have a different number of channels from the audio output. For example, the captured audio may be stereo while the audio output may include 5.1 surround sound. The mixing operation here may apply the stereo captured audio to some of the channels of the audio output (such as applying the stereo channels to a corresponding front stereo channels in the 5.1 configuration), or apply the stereo audio to all of the channels of the audio output (such as merging the stereo channels into one data stream and applying the data stream to all 5.1 channels). Other variations are possible.

In some examples, the user device may play a video clip, such as a karaoke music video. The user device may extract the audio output from the video clip. The user device may also extract a visual sequence from the video clip. The user device may merge at least a portion of the visual sequence with a corresponding portion of the final audio to form a synchronized video clip. The synchronized video clip may be saved as a new file locally or on the cloud, or may be streamed on the internet for sharing on various social networking platforms.

In some examples, the feedback signal includes a component associated with the captured audio. For example, depending on the location of the feedforward microphone/sensor, output of the speakers in the wireless audio device may be captured together with the captured audio. The user device may extract the feedback signal from the captured audio. For example, the feedback microphone and the feedforward microphone may be integrated as a single sensor in some applications, such as in wireless earbuds when bulkiness is of a concern and a design goal. In this situation, the user device may remove the component associated with the captured audio from the feedback signal to generate an updated feedback signal. The user device may determine the transmission delay based on the updated feedback signal. The user device may perform a cross correlation between the updated feedback signal and the audio output.

In some cases, the user device further preforms noise reduction of the captured audio.

In some aspects, the feedback signal may include a device specific value indicating hardware delay of the wireless audio device. For example, the device specific value may be determined based on certain hardware configuration, by looping back an A2DP audio stream. For example, the device specific value may be used in the place of the feedback signal.

In some examples, the user device provides a timecode to the audio output. The user device determines a start of an audio streaming session based on the timecode attached to the captured audio by the wireless audio device. For example, the wireless audio device receives the audio output containing the timecode. When the wireless audio device captures the captured audio, which is produced in response to the audio output played by the wireless audio device, the wireless audio device appends or otherwise includes the corresponding timecode to the captured audio. The wireless audio device then sends the captured audio to the user device, which can use the timecode to determine a start of the audio streaming session.

In some examples, the user device sends a fixed presentation delay of the audio output to the wireless audio device via an isochronous channel. For example, the isochronous channel may be applied according to the Bluetooth Core Specification 5.2. The fixed presentation delay of the audio output may assist the user device in determining the transmission delay and the return delay there between.

In some examples, the user device may provide a user interface capable of accepting user input for synchronizing the captured audio with the audio output. The user device may provide via the user interface a set of playback selection and synchronization options. The user device may further provide, via the user interface, a capability for the user to initiate a video playback that provides the audio output and synchronize the captured audio to the video playback.

Figure 8:
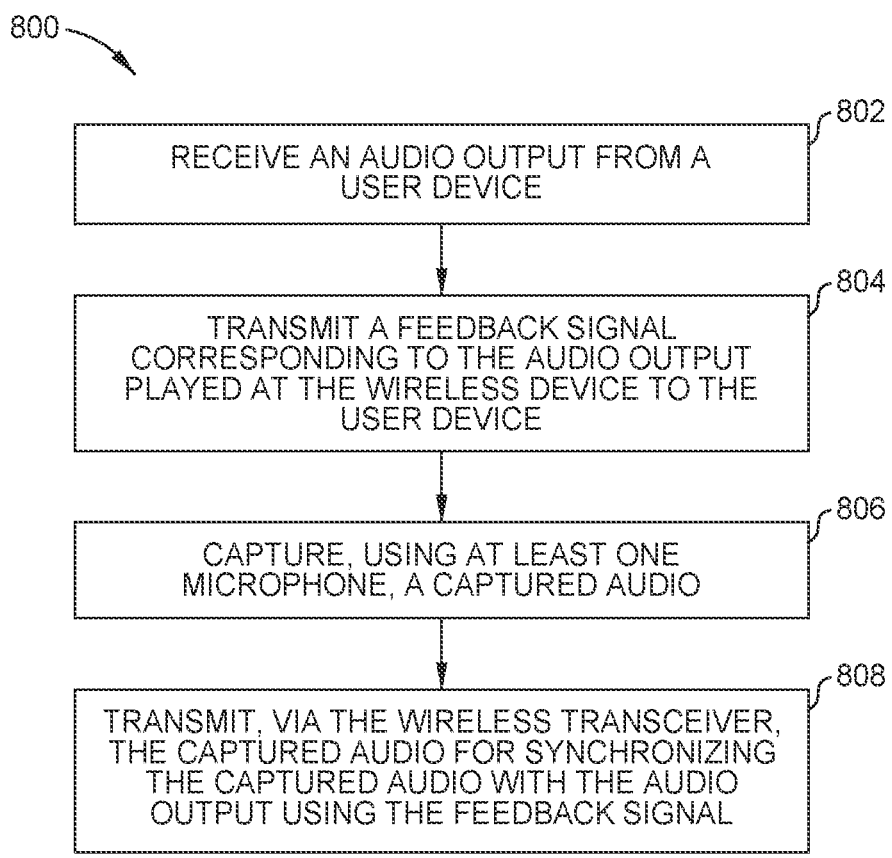
FIG. 8 is a flow diagram illustrating example operations that may be performed by a wireless audio device, in accordance with certain aspects of the present disclosure.

FIG. 8 is a flow diagram illustrating example operations 800 that may be performed by a wireless audio device. For example, the example operations 800 may be performed by the wireless audio device 110 of FIG. 1 or FIG. 2A when playing audio output from the user device and when transmitting captured audio via BLE to the user device 120. The responses and measurements in the wireless audio device, such as the quality of the feedback signal and the captured audio, is important for accurate synchronization of the captured audio with the audio output at the user device. Therefore, the operations 800 may be performed in concert with the operations 700 discussed above, for corresponding details in various aspects.

The example operations 800 begin, at 802, by receiving, in the wireless audio device via a wireless transceiver, an audio output from the user device. At 804, the wireless audio device transmits, via the wireless transceiver, a feedback signal corresponding to the audio output played at the wireless audio device. In some cases, the feedback signal is captured by a feedback microphone positioned close to a speaker that plays the audio output. In other examples, the feedback signal may be associated with known delays specific to hardware configurations.

At 806, the wireless audio device records a captured audio using at least one microphone. For example, the wireless audio device may have dedicated voice recording microphones, or may have multiple microphones positioned to acquire surround-sound, or both. In some situations, part of the captured audio may include the feedback signal that may be processed for synchronization purposes. At 808, the wireless audio device transmits the captured audio to the user device.

In some cases, the user device and the wireless audio device use a proper software codec for transmitting the compressed/encoded audio output and captured audio. The software audio codec may be capable of compressing a single mic stream in mono mode and two stereo mics in stereo or joint stereo mode. When the software audio codec is operated in stereo or joint stereo mode, it is best if two microphones feeding into this encoder instance are selected one from the left-side of the headphone/truly wireless earbud or earhook device/frames and the other from the right-side of the headphone/truly wireless earbud or earhook device/frames. Software audio codecs like SBC or mSBC that has been commonly used in Bluetooth audio related profiles would not be suitable for supporting multiple channels.

The disclosed processes are applicable with software audio codecs with high compression ratios like OPUS, CELT, etc. For example, when using CELT, mono modes with bit rates of 12 kbps per mono mic to 64 kbps per mono mic and stereo modes with bit rates of 24 kbps per stereo pair to 128 kbps per stereo pair are suitable bit rates for different applications that can be supported. Multimedia applications would want to use CELT with at least 96 kbps for a stereo pair. When using CELT, speech and voice applications would work optimally between bit rates of 24 kbps per stereo pair and 48 kbps per stereo pair.

Robust transmission of voice when bandwidth is available. Since radio conditions and temporal variations in radio performance affect the robustness, the wireless audio device may buffer some amount of audio frames. Although deep buffers result in increasing jitter and maximum latency, it adds robustness to the system. For excellent robustness against random radio events, the application should ensure that the sum of the steady-state bandwidth requirements and the bandwidth required to transmit the high watermark of the buffer in the device within the time duration that it represents is less than 80% of the available bandwidth in the Bluetooth transport.

The captured audio may be transmitted over any transports in Bluetooth. Each transport may have characteristics that impose limitations: LE-CoC (Bluetooth LE based Connection Oriented Channels), GATT/LE (GATT over LE), GATT/BR/EDR (GATT over Bluetooth BR/EDR), SPP (Serial Port Protocol over Bluetooth BR/EDR) or RFCOMM based proprietary protocols. These Bluetooth transport protocols are reliable from a radio communication perspective. By using a deep enough buffer and planning the bit-rate of the audio stream for the application based on the available bandwidth over the chosen transport, multiple mic channels can be transmitted.

Various processing sequences are possible. For example, the various microphones, including the one or more feedback microphones and feedforward microphones on the wireless audio device, may first acquire multiple captured audio. The captured audio may then be compressed and packetized. The data packets may then be multiplexed and transmitted. The user device, upon receiving the data packets, may demultiplex the packets and decode for the captured audio. In another example, compression may occur after forming the data packets and having appended the timestamps thereto. The compressed data packets may then be multiplexed and transmitted. In yet another example, the captured audio may be packetized for each data stream. Each packet is then timestamped and transmitted in separate channels to the user device and does not require multiplexing. Other sequence configurations of data compression and transmission are possible.

In some cases, the data rate of the wireless audio device to the user device may reflect whether more than one stereo channels of audio stream are streamed back from the wireless audio device to the user device. A substantial amount of data streamed back may be associated with the synchronization techniques presented in Examples I and II. In other cases when only the microphone track ($A_{ff}$) is transferred from the wireless audio device to the user device, then the synchronization may be performed with the techniques presented in Examples III and IV. For example, Packet Logger software on iOS/macOS machines may be used in obtaining the decrypted Bluetooth traffic for such analysis. Similar or alternative means to examine Bluetooth traffic record may be used to identify the application of Examples I-IV.

In other aspects, the disclosed methods are applicable to wireless earbuds, earhooks, or ear-to-ear devices. For example, a host like a mobile phone may be connected over Bluetooth to a bud (e.g., right side) and that right-side bud further connects to the left-side bud using either a Bluetooth link or using other wireless technologies like NFMI or NFEMI. The left-side bud is first time-synchronized with the right-side bud. Audio frames (compressed in mono) are sent from the left-side bud with its timestamp (which is synchronized with the right bud's timestamp) as described in the technology above. The right bud will forward these encoded mono frames along with its own frames. The right bud will not wait for an audio frame from the left bud with the same timestamp. Instead, the right-bud sends whatever frame is available and ready to be sent with suitable packing. It is the responsibility of the receiving application in the host to assemble the packets using the timestamp and the channel number. The receiving application, depending upon how it is configured, can choose to merge the decoded mono channel of one bud and a decoded mono channel of the other bud into a stereo track based on the timestamp included in the header of the received encoded frames. The present disclosure allows the right-side bud to simply forward the audio frames from the left-side bud without decoding the frame. This helps to conserve battery power in truly wireless audio devices.

In some aspects, the techniques variously described herein can be used to improve virtual personal assistant (VPA) functionality. For instance, the techniques described herein can improve wake-up word (WuW) support for one or more VPAs (such as Google Assistant, Amazon's Alexa, Apple's Siri, Samsung's Bixby, Microsoft's Cortana, Tencent's Xiaowei, Huawei's Celia, and so forth). For example, in some such aspects, the techniques described herein enable offloading of WuW processing from the source device (e.g., headphones, earbuds, or some other wearable device) to the target device (e.g., a smartphone, tablet computer, or other device with relatively more processing capabilities). This can provide a benefit to implementing WuW functionality (for VPAs or other applications), as WuW processing may be large in size and/or use intensive computing resources such that a relatively more capable processing device (such as a smartphone) can provide better support for the WuW processing. In addition, by offloading the WuW processing from the source device to the target device, enabling multiple simultaneous WuW support (e.g., for two or more VPAs). This can benefit the user by allowing the best VPA to be used for a desired use case, either manually (e.g., by using the specific WuW to access the desired VPA) or automatically (e.g., by having a single WuW that routes the VPA request to the VPA service that can best handle the inquiry/request). For example, a VPA request to Amazon's Alexa (manually made by saying "Alexa" or automatically made via a custom WuW) may be used to play music while a VPA request to Google Assistant (manually made by saying "Hey Google" or automatically made via the custom WuW) may be used to schedule a calendar meeting. This can also lead to easier VPA WuW support certification, as the VPA service's software can be run on the target device as opposed to using the source device's software to detect and process WuWs. Further, the WuW support can be standardized across multiple different target devices to support multiple different source devices.

In some aspects, the techniques variously described herein can be used to determine contextual information for a source device and/or the user of the source device. For instance, the techniques can be used to help determine aspects of the user's environment (e.g., noisy location, quiet location, indoors, outdoors, on an airplane, in a car, etc.) and/or activity (e.g., commuting, walking, running, sitting, driving, flying, etc.). In some such aspects, the sensor data received from the source device can be processed at the target device to determine such contextual information and provide new or enhanced experiences to the user. For example, this could enable playlist or audio content customization, noise cancellation adjustment, and/or other settings adjustments (e.g., audio equalizer settings, volume settings, notification settings, etc.), to name a few examples. As source devices (e.g., headphones or earbuds) typically have limited resources (e.g., memory and/or processing resources), using the techniques described herein to offload the processing of data from sensors of the source device(s) to a target device while having a system to synchronize the sensor data at the target device provides a variety of applications. In some aspects, the techniques disclosed herein enables the user device to automatically identify an optimized or a most favorable configuration or setting for the synchronized audio capture operations.

In some aspects, the techniques variously described herein can be used for a multitude of audio/video applications. For instance, the techniques can be used for stereo or surround sound audio capture from a source device to be synchronized at a target device with video captured from the same source device, another source device, and/or the target device. For example, the techniques can be used to synchronize stereo or surround sound audio captured by microphones on a pair of headphones with video captured from a camera on or connected to the headphones, a separate camera, and/or the camera of a smartphone, where the smartphone (which is the target device in this example) performs the synchronization of the audio and video. This can enable real-time playback of stereo or surround sound audio with video (e.g., for live streaming), capture for recorded videos with stereo or surround sound audio (e.g., for posting to social media platforms or news platforms). In addition, the techniques described herein can enable wireless captured audio for audio or video messages without interrupting a user's music or audio playback. Thus, the techniques described herein enable the ability to produce immersive and/or noise-free audio for videos using a wireless configuration. Moreover, as can be understood based on this disclosure, the techniques described enable schemes that were only previously achievable using a wired configuration, so the techniques described free the user from the undesirable and uncomfortable experience of being tethered by one or more wires.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A system comprising:
   transmitting an audio output from a user device to a wireless audio device;
   receiving a captured audio at the user device from the wireless audio device;
   capturing, using a feedback microphone included in the wireless audio device, a feedback signal, wherein the feedback signal is a function of:
     a delay between the audio output transmitted to the wireless audio device and the audio output played at the wireless audio device,
     the audio output, and
     the captured audio;
   receiving the feedback signal at the user device from the wireless audio device, wherein the feedback signal comprises a component associated with the captured audio;
   removing the component associated with the captured audio from the feedback signal to generate an updated feedback signal;
   determining the delay by performing a cross correlation between the updated feedback signal and the audio output transmitted by the user device;
   applying the delay to the captured audio to effectively shift the captured audio by the delay to form a delayed captured audio;
   trimming the delayed captured audio according to the audio output transmitted by the user device to form a trimmed captured audio; and
   synchronizing the trimmed captured audio with the audio output transmitted by the user device.

2. The system of claim 1, wherein synchronizing the trimmed captured audio to the audio output further comprises:
   determining, based on the feedback signal, a round-trip delay between the audio output transmitted by the user device and an audio playback at the wireless audio device.

3. The system of claim 2, further comprising:
   filtering the audio output before performing the cross correlation between the updated feedback signal and the audio output.

4. The system of claim 2, further comprising:
   trimming the delayed captured audio according to the audio output to a final composition based on the round-trip delay.

5. The system of claim 4, wherein synchronizing the captured audio to the audio output using the updated feedback signal comprises:
   mixing the trimmed captured audio and the audio output to output a final audio.

6. The system of claim 5, further comprising:
   playing a video clip at the user device;
   extracting the audio output from the video clip;
   extracting a visual sequence from the video clip; and
   merging the visual sequence with the final audio to form a synchronized video clip.

7. The system of claim 2, further comprising sending a fixed presentation delay of the audio output from the user device to the wireless audio device via an isochronous channel, wherein the fixed presentation delay of the audio output assists in determining the round-trip delay.

8. The system of claim 1, further comprising performing noise reduction of the captured audio.

9. The system of claim 1, wherein the feedback signal comprises a device specific value indicating hardware delay of the wireless audio device.

10. The system of claim 9, further comprising looping back an advanced audio distribution profile (A2DP) stream to determine the device specific value.

11. The system of claim 10, further comprising:
    providing a timecode to the audio output; and
    determining a start of an audio streaming session based on the timecode attached to the captured audio by the wireless audio device.

12. The system of claim 11, wherein synchronizing the captured audio to the audio output comprises aligning the start of the audio streaming session with a start of the audio output.

13. The system of claim 1, further comprising:
    providing a user interface on the user device, the user interface capable of accepting user input for synchronizing the captured audio to the audio output;
    providing via the user interface a set of playback selection and synchronization options; and
    providing, via the user interface, a capability for a user to initiate a video playback that provides the audio output and synchronize the captured audio to the video playback.

14. A method performed by a wireless audio device, the method comprising:
    receiving an audio output from a user device;
    capturing, using at least one microphone, a captured audio;
    capturing, using a feedback microphone, a feedback signal, wherein the feedback signal is a function of:
      a delay between the audio output received from the user device and the audio output played at the wireless audio device,
      the audio output received from the user device, and
      the captured audio;
    transmitting, to the user device, the feedback signal, wherein the feedback signal comprises a component associated with the captured audio;
    removing the component associated with the captured audio from the feedback signal to generate an updated feedback signal;

determining the delay by performing a cross correlation between the updated feedback signal and the audio output received from the user device;

applying the delay to the captured audio to effectively shift the captured audio by the delay to form a delayed captured audio;

trimming the delayed captured audio according to the audio output received from the user device to form a trimmed captured audio; and transmitting, to the user device, the trimmed captured audio for synchronizing the trimmed captured audio with the audio output received from the user device.

15. The method of claim 14, further comprising:

trimming the delayed captured audio according to the audio output to a final composition based on a round-trip delay identified based on the feedback signal.

16. The method of claim 15, further comprising:

receiving a fixed presentation delay of the audio output from the user device via an isochronous channel, wherein the fixed presentation delay of the audio output assists in determining the round-trip delay.

17. The method of claim 14, further comprising performing noise reduction of the captured audio.

18. The method of claim 14, wherein the feedback signal comprises a device specific value indicating hardware delay of the wireless audio device.

19. The method of claim 18, further comprising looping back an advanced audio distribution profile (A2DP) stream to determine the device specific value.

20. The method of claim 19, wherein the audio output includes a timecode provided by the user device, and further comprising:

determining, by the wireless audio device, a start of an A2DP session based on the timecode attached to the captured audio.

21. The method of claim 14, wherein the at least one microphone comprises one or more feedforward microphones.

* * * * *